US011469880B2

(12) United States Patent
Ponnuswamy et al.

(10) Patent No.: US 11,469,880 B2
(45) Date of Patent: Oct. 11, 2022

(54) DATA AT REST ENCRYPTION (DARE) USING CREDENTIAL VAULT

(71) Applicant: EMC IP Holding Company LLC, Hopkinton, MA (US)

(72) Inventors: Senthil Ponnuswamy, San Jose, CA (US); Elie Jreij, Pflugerville, TX (US); Marcelo Vinante, Georgetown, TX (US); Anurag Sharma, Cedar Park, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 16/998,472

(22) Filed: Aug. 20, 2020

(65) Prior Publication Data

US 2022/0060317 A1 Feb. 24, 2022

(51) Int. Cl.
| | |
|---|---|
| *H04L 9/06* | (2006.01) |
| *H04L 9/08* | (2006.01) |
| *G06F 11/14* | (2006.01) |
| *G06F 21/78* | (2013.01) |
| *H04L 9/32* | (2006.01) |

(52) U.S. Cl.
CPC ........ *H04L 9/0631* (2013.01); *G06F 11/1451* (2013.01); *G06F 11/1469* (2013.01); *G06F 21/78* (2013.01); *H04L 9/0825* (2013.01); *H04L 9/0897* (2013.01); *H04L 9/3234* (2013.01)

(58) Field of Classification Search
CPC ... H04L 9/0631; H04L 9/0825; H04L 9/0897; H04L 9/3234; G06F 11/1451; G06F 11/1469; G06F 21/78
See application file for complete search history.

(56) References Cited

U.S. PATENT DOCUMENTS

| | | | |
|---|---|---|---|
| 9,882,720 B1* | 1/2018 | Levy | H04L 9/3247 |
| 10,922,132 B1* | 2/2021 | Shiramshetti | H04L 9/0894 |
| 2014/0006806 A1* | 1/2014 | Corella | G06F 21/62 |
| | | | 713/193 |
| 2015/0095638 A1* | 4/2015 | Smith | H04L 9/0822 |
| | | | 713/155 |
| 2020/0195425 A1* | 6/2020 | Mistry | H04L 63/123 |
| 2021/0157760 A1* | 5/2021 | Kaier | G06F 13/423 |
| 2021/0359855 A1* | 11/2021 | Voss | H04L 9/0894 |

* cited by examiner

*Primary Examiner* — Philip J Chea
*Assistant Examiner* — Sangseok Park
(74) *Attorney, Agent, or Firm* — Staniford Tomita LLP

(57) ABSTRACT

A subset of data encryption keys are stored in plain text form in system memory of an information handling system. A master key and another subset of the data encryption keys are stored in a credential vault of the information handling system. The credential vault forms part of an out-of-band management platform and is protected by an AES key. A request is received for a data encryption key to decrypt a unit of data backed up to backup storage of the information handling system, the unit of data having been encrypted by the data encryption key, and the data encryption key having been encrypted by the master key and stored at the backup storage as an encrypted data encryption key. One or more locations are checked for the data encryption key. The one or more locations include the system memory, credential vault, and backup storage.

9 Claims, 7 Drawing Sheets

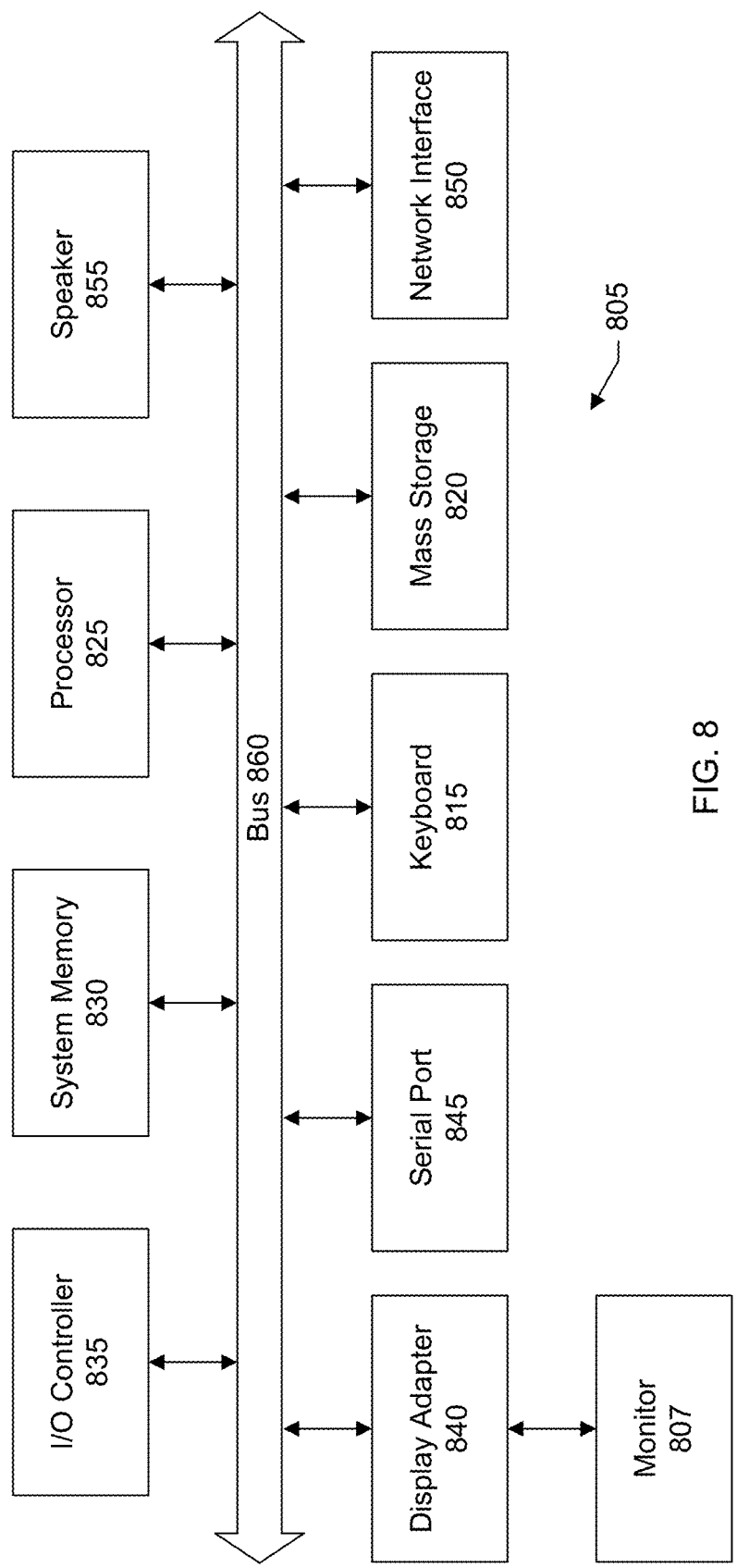

DATA AT REST ENCRYPTION (DARE) USING CREDENTIAL VAULT

TECHNICAL FIELD

The present invention relates generally to the field of information management, and, more particularly, to encryption.

BACKGROUND

Data at rest typically refers to inactive data that is stored persistently such as on disk, tape, or other storage media. Data at rest is subject to threats from hackers and other malicious threats. To prevent this data from being accessed, modified or stolen, organizations will often employ security protection measures such as password protection, data encryption, or a combination of both.

Some systems may be provided with a trusted platform module (TPM). A TPM is a specialized chip on a device that provides hardware-based security functions. Such security functions can include cryptographic operations. Hackers and other bad actors, however, can be very persistent. A compromised TPM can expose an organization's user data. The TPM typically has limited processing resources. Thus, constant use of the TPM can increase response times.

There is a continuing demand to provide ever increasing levels of security and protection both in systems having the TPM and in systems not having the TPM. Unfortunately, increases in security protocols are often accompanied by decreases in system performance and degradation of the user experience. There is a need for improved systems and techniques that provide both strong security and good system performance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 8 shows a block diagram of a computer system suitable for use with the information processing system, according to one or more embodiments.

DETAILED DESCRIPTION

Figure 1:
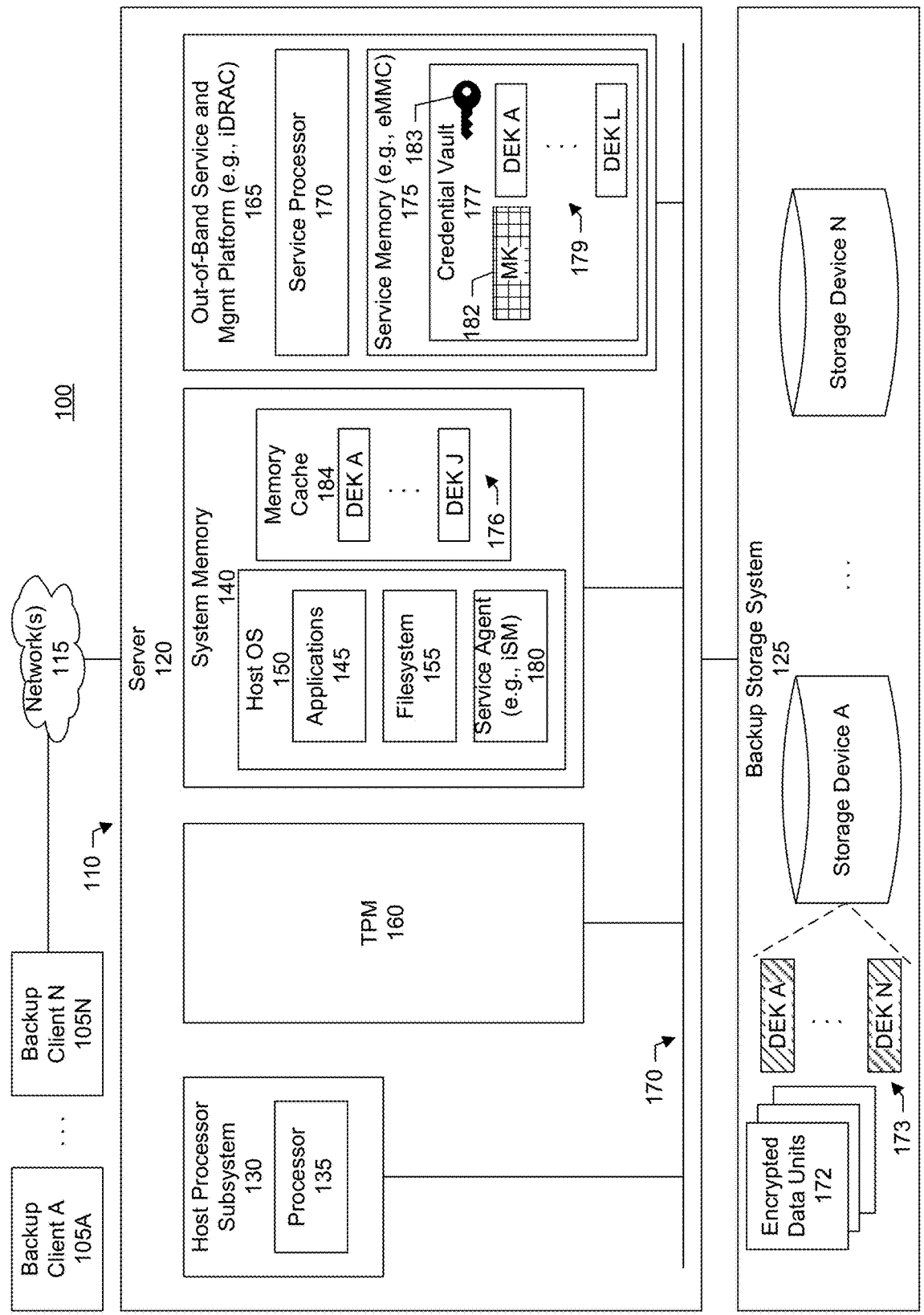
FIG. 1 shows a block diagram of an information handling system for providing both robust security for data at rest and good system performance in accordance with one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

FIG. 1 shows a block diagram of a system 100 for encrypting data at rest. This system includes any number of backup clients 105A-N, an information handling system (IHS) 110, and a network 115 connecting the clients and information handling system. The variable N and other similar index variables are assumed to be arbitrary positive integers greater than or equal to two.

The information handling system includes a server 120 connected to a backup storage system 125, via, for example, a local area network (LAN) or a storage area network (SAN). The backup storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks.

The server includes a host processor subsystem 130 having a host processor 135, system memory 140 storing data including applications 145, a host operating system (OS) 150, and a filesystem 155, a trusted platform module (TPM) 160, and an out-of-band service and management platform 165, each of which are connected by a bus 170 or other interconnection scheme that allows communications among the different components. In a specific embodiment, the TPM chip is optional and is not included in some embodiments.

In a specific embodiment, the server executes a backup or data protection application that is responsible for backing up data from the clients to the backup storage system. The filesystem provides a way to organize data stored at the storage system and present that data to the applications in a logical format.

The storage system may be a deduplicated storage system in which data, e.g., files, may be divided, chunked, or segmented into various data units. Unique data units may be stored. Data units identified as duplicate or redundant data already stored may not be again stored. The data stored at backup storage may be referred to as data at rest. Data at rest refers to data stored in persistent storage (e.g., disk or tape).

Some examples of data at rest include financial records such as a customer credit card numbers, company trade secrets such as a new design for an electric vehicle, patient health records, and other valuable and sensitive data.

Data at rest is subject to threats from hackers and other malicious threats. To prevent this data from being accessed, modified or stolen, security protection measures may be employed including password protection and encryption. Specifically, data units 172 stored, residing, or maintained in the storage system may be encrypted using data encryption keys (DEK) 173 which, in turn, are also encrypted by a master key. Different data units or segments may be encrypted using different data encryption keys.

The data encryption keys may be generated by the storage system or by an external key manager. Encryption is a process of encoding data based on a cryptographic key. In cryptography, a key is a string of characters used within an encryption algorithm for altering data so that it appears random. For encryption algorithms, a key specifies the transformation of plain text into cipher text, and vice versa for decryption algorithms. In other words, once data has been encrypted, the data will not be readable or otherwise usable without having an appropriate key to decrypt the data. There can be many thousands of data encryption keys encrypted by the master key.

Hackers are continuing in their attempts to breach computer networks and steal data. Hacking tactics may include inducing or tricking legitimate users in the organization to download malicious applications or even absconding with the physical storage devices themselves. Thus, there is a continuing need for better security to prevent the unauthorized access of data. There remains a tension, however, between security and performance. For example, decrypting data in response to a legitimate request can require a number of different operations and compute resources which can lead to undesirably long response times. There is a need to provide both improved security while also ensuring good performance so that daily business operations can continue with minimal disruption.

As discussed, in order to provide protection of the user data stored in a filesystem, the data needs to be encrypted using data encryption keys (DEK). After encrypting the user data, the DEK needs to be stored along with the encrypted data so that the user data can be decrypted and read using the DEK that was used for encryption.

To protect the DEK, the DEK needs to be encrypted before it is stored persistently along with the user data. In an environment where external key managers are available the master key (MK) can be stored in the external key manager. However, not many customers have an external key manager. In a specific embodiment, the MK is derived from the passphrase provided by the storage administrator and for protecting the MK there are two options: 1) For best security, the MK should not be stored on the storage system. However, this solution will have the inconvenience of the storage administrator having to enter the MK every time the system reboots. 2) As recommended by the National Institute of Science and Technology (NIST), the MK should be stored in a physically separate location from where the user data and encrypted DEKs are stored.

One way of achieving this physical separation is to use a trusted platform module (TPM). A TPM is a chip on the computer's motherboard. The TPM device includes non-volatile protected memory that stores an endorsement key and a storage root key. The endorsement key is an encryption key that is permanently embedded in the TPM security hardware, generally at the time of manufacture. This private portion of the endorsement key is never released outside of the TPM. The public portion of the endorsement key helps to recognize a genuine TPM. TPM operations that involve signing pieces of data can make use of the endorsement key to allow other components to verify that the data can be trusted. To sign a piece of data, a private key is used to encrypt a small piece of information. The signature can be verified by using the corresponding public key to decrypt that same piece of data. If it can be decrypted with the public key, then it must have been encrypted by the corresponding private key. As long as that private key has been kept secret, this digital signature can be trusted.

The storage root key is embedded in the TPM security hardware. It is used to protect TPM keys created by applications, so that these keys cannot be used without the TPM. Unlike the endorsement key (which is generally created when the TPM is manufactured), the storage root key is created when the administrator user takes ownership of the TPM. This means that if the TPM is cleared and a new user takes ownership, a new storage root key is created. The storage root key may be used to wrap TPM protected keys which can be stored outside the TPM. That data stored outside the TPM can be decrypted by passing it back through the TPM again for a decryption operation.

In a specific embodiment, systems and techniques are provided for increasing the security provided by the TPM chip alone or to provide physical separation when a TPM is not present.

The following non-limiting definitions shown in table A below may be helpful in understanding the specification and claims:

of whether the host system is powered on or whether an operating system is installed or functional. iDRAC includes a persistent storage device. In a specific embodiment, the storage device is an embedded multimedia card (eMMC). An embedded multimedia card is a small storage device made up of NAND flash memory and a storage controller. Both the flash memory and controller are contained on a single integrated circuit (IC) that is embedded permanently into a device. Examples of servers having remote access controllers, e.g., iDRAC, are the PowerEdge servers available from Dell Technologies. It should be appreciated, however, that aspects and principles of the systems and techniques described herein can be applied to other out-of-band management platforms, remote access controllers, and the like.

As discussed, in a specific embodiment, data at rest such as user data maintained within the backup storage system is encrypted using data encryption keys. To protect the data encryption keys, the data encryption keys are encrypted by the master key. In turn, the master key itself thereby requires protection.

In a specific embodiment, the out-of-band management platform has its own processor, memory, network connection, and access to the system bus. For example, a service processor 170 of the management platform may be separate or different from host processor 135. Service memory 175 of the management platform may be separate or different from system memory 140. In a specific embodiment, the service memory includes a persistent storage device, e.g., eMMC, having a credential vault 177. The out-of-band management platform may have its own network interface separate or

TABLE A

| Terms | Definitions |
|---|---|
| DEK | Data Encryption Key used to encrypt the user data |
| MK | Master key derived from user passphrase used to encrypt the DEK |
| TPM | A Trusted Platform Module (TPM) is a microchip designed to provide basic security-related functions, primarily involving encryption keys. The TPM is usually installed on the motherboard of a computer, and it communicates with the remainder of the system by using a hardware bus. |
| Key Wrapping | Computers that incorporate a TPM can create cryptographic keys and encrypt them so that they can only be decrypted by the TPM. This process, often called wrapping or binding a key, can help protect the key from disclosure. Each TPM has a master wrapping key, called the storage root key, which is stored within the TPM itself. The private portion of a storage root key or endorsement key that is created in a TPM is never exposed to any other component, software, process, or user. |
| Credential Vault | Credential Vault (CV) available in iDRAC eMMC flash storage. The Advanced Encryption Standard (AES) encryption key that is used to encrypt CV is a random key that is fused in the iDRAC silicon and is different on each iDRAC chip. The AES key is not readable by firmware. Firmware can call HW accelerators that use the hidden key to encrypt and decrypt data. |

Some embodiments are described in conjunction with an out-of-band management platform or service module referred to as integrated Dell Remote Access Controller (iDRAC) and iSM, respectively, and available from Dell Technologies Inc. of Round Rock, Tex. iDRAC may be embedded within certain servers and provides functionality that helps information technology (IT) administrators deploy, update, monitor, and maintain the servers. iDRAC is type of a remote access controller that can allow an administrator to manage various components of the host system from a remote location. In a specific embodiment, a dedicated management channel is provided that allows the system administrator to monitor the host system regardless different from a network interface of the host system. In a specific embodiment, the network interface of the out-of-band management platform includes a universal serial bus network interface card (USB MC).

In a specific embodiment, contents of the credential vault are protected and encrypted using an advanced encryption standard (AES) key 183, such as a 256-bit AES key. The AES key is burned into the hardware components of the out-of-band management platform associated with the credential vault and is not available to software components outside the management platform. The credential vault is independent or separate from the TPM chip, thus providing another or additional level of security. In a specific embodiment, computing operations for encrypting and decrypting the contents of the credential vault are provided by a hardware accelerator. The hardware accelerator includes specialized processing circuitry that is pre-configured to perform a discrete set of computing operations for encrypting and decrypting the contents of the credential vault. This allows for encrypting and decrypting to be completed much faster as compared to using a general central processor. In a specific embodiment, the credential vault is leveraged to provide another caching mechanism for the data encryption keys. The credential vault may include a database or any other competent data structure that allows for the storage, organization, and retrieval of data including, for example, master and data encryption keys.

The out-of-band management platform can provide an alternate and dedicated connection to the system separate from the actual network that the system runs on. This allows an administrator to ensure the establishment of trust boundaries since there is only a single entry point for the management interface. Device management through out-of-band management may be performed via a network connection that is separate physically from the "in-band" network connection that the system is serving.

In a specific embodiment, the out-of-band management platform includes a service agent 180 installed in the operating system and residing in system memory. The service agent may be executed by host processor subsystem and provides monitoring information to the out-of-band management platform. The monitoring details may include, for example, host OS name, server host Internet Protocol (IP) address information, and OS version. In a specific embodiment, the out-of-band management platform can only be accessed from within the host OS via the service agent. The out-of-band management platform may interface with baseboard management controller (BMC) chips, and may be based on the Intelligent Platform Management Interface (IPMI) 2.0 standard, which allows use of IPMI out-of-band interfaces such as IPMI Over LAN.

Figure 2:
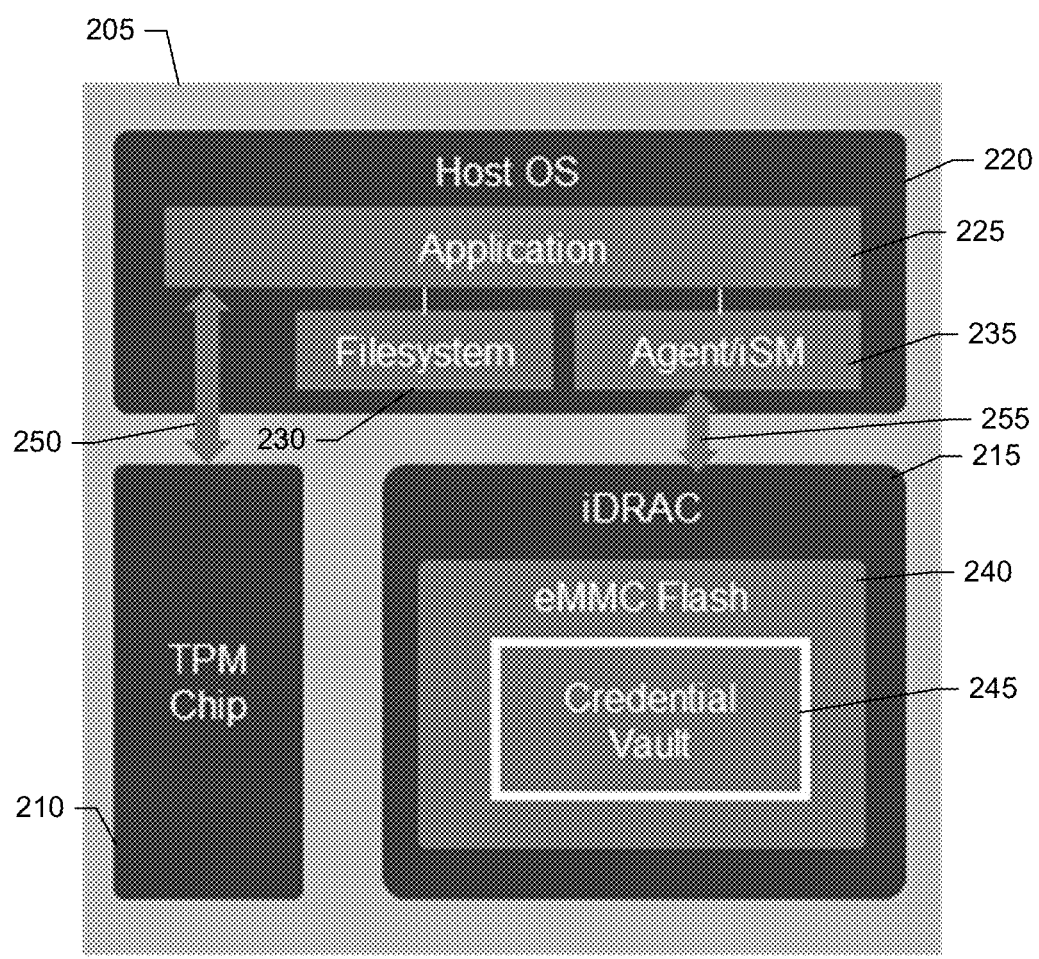
FIG. 2 shows a block diagram of a server of the information handling system in accordance with one or more embodiments.

FIG. 2 shows an architecture diagram of a server 205 having a TPM chip 210 and an out-of-band management and service platform (e.g., iDRAC) 215. As shown in the example of FIG. 2, there is a host operating system (OS) 220, applications 225, filesystem 230, and service agent (e.g., iSM) 235. The applications, filesystem, and service agent run within the host operating system. The out-of-band management platform includes service memory (e.g., eMMC flash) 240 having a credential vault 245. An arrow 250 indicates a communication pathway between the TPM chip and host OS. An arrow 255 indicates a communication pathway between the out-of-band management platform and agent.

The service agent is responsible for handling the communications between the management platform and TPM and other functions and operations occurring at the operating system level. In a specific embodiment, out-of-band (OOB) access to the management platform (e.g., iDRAC) is blocked by periodic randomization of root password and deletion of additional users in iDRAC by the OS agent. The management platform (e.g., iDRAC) can only be accessed from within the host OS via the agent (e.g., iSM). In a specific embodiment, the management platform is not exposed to the customer. For example, there can be a purpose-built appliance such as Data Domain provided by Dell EMC, using a PowerEdge server in which the iDRAC is not exposed to the customer.

Figure 3:
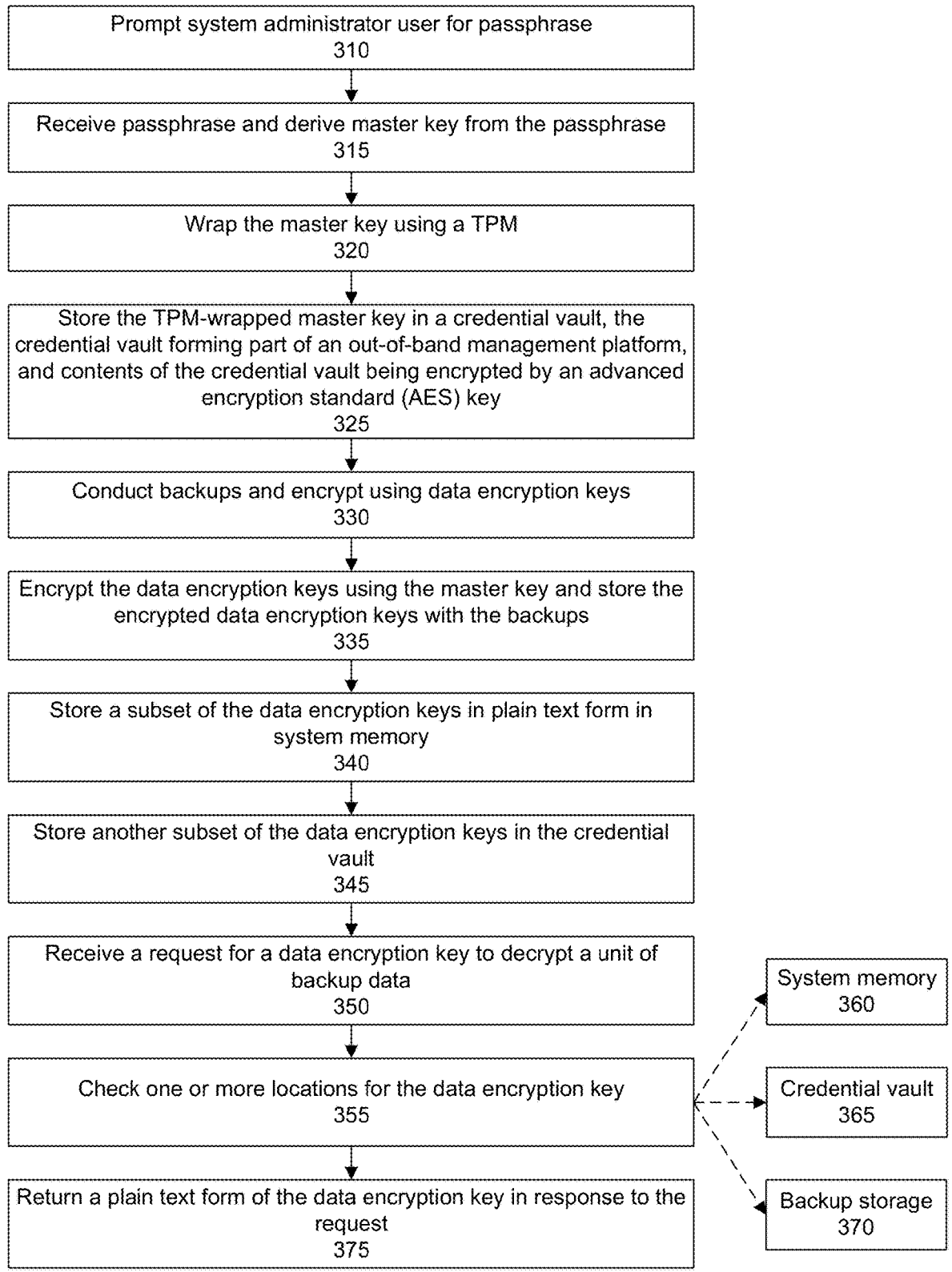
FIG. 3 shows an overall flow of a configuration and operation of a system providing robust security for data at rest and good system performance in accordance with one or more embodiments.

FIG. 3 shows an overall flow for protecting data at rest while also ensuring good performance of the filesystem. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 310, a system administrator of a customer user is prompted for a passphrase. In a step 315, the passphrase is received and a master key is derived from the passphrase. The master key is used to protect the data encryption keys.

In a step 320, the master key is wrapped using the trusted platform module (TPM). For example, the agent may call the TPM and pass the master key to the TPM for wrapping. Once the wrapping operation is complete, the TPM-wrapped master key may then be received by the agent. In a step 325, the TPM-wrapped master key is stored in the credential vault. Referring back now to FIG. 1, contents of the credential vault are shown as including a master key 182. The master key is shown using a fill pattern of gridlines to indicate that it has been wrapped by the TMP. As discussed, the credential vault forms part of an out-of-band management platform where contents of the credential vault are encrypted by an AES key 183 fused at the factory. The master key is stored in the credential vault (e.g., eMMC flash) and not in the filesystem. In the event that the TPM is compromised, the users' data is still protected via the master key that is held protected in the credential vault.

In a step 330 (FIG. 3), backups are conducted and encrypted using data encryption keys. In a step 335, the data encryption keys are encrypted using the master key. The encrypted data encryption keys are stored together with the backups. For example, referring back now to FIG. 1, the backup storage system is shown as including encrypted data units 172 along with data encryption keys (DEK) A-N 173. DEKs A-N 173 are shown with a fill pattern of vertical lines to indicate that they have been encrypted by the master key. The backup storage system stores a complete set of the data encryption keys. The master key, however, is not stored in the backup storage system with encrypted DEKs A-N 173. Instead, as shown in the example of FIG. 1, the master key is stored in the protected credential vault and separate from the backup storage system storing the user data content and encrypted DEKs A-N 173.

In a step 340 (FIG. 3), a subset or portion of the data encryption keys are stored in plain text form in system memory. For example, in FIG. 1, DEKs A-J 176 are shown without a background fill pattern to indicate that they are being stored in plain text form. The system memory thereby forms a memory cache 184 for holding a portion of the data encryption keys. In a step 345, another subset or portion of the data encryption keys 179 (e.g., DEKs A-L, FIG. 1) are stored in the credential vault whose contents, as discussed, are protected by the AES key. In a specific embodiment, the credential vault acts as another level of caching in which another portion of the data encryption keys are held.

To prevent memory attacks and mitigate such attacks, the memory cache is configured to hold at most a threshold percentage of a total number of the data encryption keys. The threshold percentage can be configurable such as by an administrator of the system. In a specific embodiment, the memory cache can be configured to hold at a maximum of 5% of the keys. The keys are loaded in memory only on demand and when the system is idle, there will be no keys in memory.

Likewise, for balanced security and performance, the credential vault can be configured to hold at most another threshold percentage of the data encryption keys. In a specific embodiment, the credential vault is configured to hold 20% of the DEKs. The percentage of the number of keys to be held in the credential vault is configurable such as by the administrator of the system. The system provides flexibility as each individual administrator and customer or organization can decide the appropriate trade-off between performance and security. If all the DEKs are in the credential vault, the filesystem will perform better. If the DEK is not in credential vault, then the TPM wrapped MK must be unwrapped in TPM. This TPM unwrapping can be eliminated if the DEK is in credential vault.

The risk to this approach is when the bad actor obtains access to the credential vault, he will be able to decrypt the DEKs using the fused AES key. For DEKs that are not stored in credential vault, he will need access to the fused key as well as the TPM seed to unwrap the MK and decrypt the DEKs.

For filesystems that support pre-fetching, not storing all the DEKs should not be an issue since the credential vault and memory cache can be populated with DEKs that will be subsequently required by the filesystem for decrypting the user data.

If the solution is based only on the TPM then either the keys must be unwrapped and held in memory or the keys should be unwrapped only when they are required. This will lead to either exposure of plain text keys in memory or performance will be impacted due to unwrapping of keys.

The credential vault provides both secure storage and faster access to the keys which are important for a high-performance secure filesystem. In a specific embodiment, the system memory or cache is configured to hold a first threshold percentage of the data encryption keys. The credential vault is configured to hold a second threshold percentage of the data encryption keys, different from the first threshold percentage. For example, the second threshold percentage may be greater than the first threshold percentage. A greater number of keys may be held in the credential vault as compared to the system memory as the credential vault is protected by the AES key.

Limiting the number of keys held in system memory helps to reduce exposure to memory attacks while also providing good levels of performance and response. For example, retrieving a data encryption key that is already in its plain text form from system memory is much faster than having to access the backup storage system and decrypt an encrypted data encryption key. The storage devices (e.g., disk arrays) used for backup storage typically have higher response times as compared to system memory. Further, decryption requires time and compute resources.

As discussed, contents of the credential vault are protected by a factory fused AES key. Thus, retrieval times for the credential vault may be longer than system memory because of the AES encryption employed by the credential vault. So, a check of the credential vault may be performed after a determination that a check of the system memory failed to locate the data encryption key. Nonetheless, retrieving the data encryption key from the credential vault can be a much faster operation as compared to having to access the backup storage to retrieve (and decrypt) the encrypted data encryption key.

The data encryption keys stored at backup storage are encrypted by the master key. Thus, additional operations and processing are required to decrypt a data encryption key that has been encrypted by the master key and stored at backup storage. Specifically, to decrypt the data encryption key in embodiments having the TPM, a request is made to the TPM to unwrap the master key. Once the master key has been unwrapped, the master key is used to decrypt the encrypted data encryption key located at the backup storage system.

For example, in a step 350, a request is received for a data encryption key to decrypt a unit of backup data. There are multiple potential locations, including the system memory, credential vault, and storage system where the data encryption key may be located. In a specific embodiment, an algorithm uses an escalating examination technique to search for the data encryption key. This escalating technique begins and proceeds in order of which locations offer the fastest response times.

More particularly, in a step 355, checks are performed of one or more locations for the data encryption key. In a specific embodiment, a first check includes checking system memory (step 360). A second check, after the first check, includes checking the credential vault (step 365). A third check, after the first and second checks, includes checking the backup storage (step 370). Thus, in a specific embodiment, the system memory functions as a first level of cache and the credential vault functions as a second level of cache. The checking process may be halted once a determination is made that the data encryption key has been found. For example, if the data encryption key is found in the system memory cache, the second and third checks in the credential vault and backup storage, respectively, do not have to be carried out. Likewise, if the data encryption key is found in the credential vault, the backup storage does not have to be checked.

In a specific embodiment, eviction algorithms are associated with the memory cache and credential vault to evict older or unused data encryption keys when the cache is full (e.g., max threshold percent of data encryption keys has been reached). For example, in a specific embodiment, a method includes attempting to add a data encryption key to a memory cache storing a subset of data encryption keys; determining that a number of keys in the subset exceeds a maximum percentage of a total number of data encryption keys allowed to be stored in the memory cache; evicting an oldest data encryption key from the memory cache, the oldest data encryption key having a last used timestamp that is earlier than other data encryption keys in the subset of data encryption keys held in the memory cache; and after the evicting, storing the data encryption key in the memory cache. In another specific embodiment, a method includes attempting to add a data encryption key to a credential vault, protected by an AES key, storing a subset of data encryption keys; determining that a number of keys in the subset exceeds a maximum percentage of a total number of data encryption keys allowed to be stored in the credential vault; evicting an oldest data encryption key from the credential vault, the oldest data encryption key having a last used timestamp that is earlier than other data encryption keys in the subset of data encryption keys held in the credential vault; and after the evicting, storing the data encryption key in the credential vault.

In cases where a third check must be performed because the data encryption key cannot be found in system memory and the credential vault, the data encryption key having been finally located at the backup storage is added to the system memory and credential vault. Adding the data encryption key to system memory (in plain text) and to the credential vault helps to facilitate later or subsequent requests for the data encryption key and improve performance. For example, in a subsequent request for the data encryption key, the data encryption key may be located in system memory or the credential vault, thereby avoiding the need to access the backup storage system. Further discussion is provided below. In a step 375, a plaintext form of the data encryption key is returned in response to the request.

The flow shown in FIG. 3 may be organized into three stages. A first stage includes enabling encryption. A second stage includes enabling the filesystem. A third stage includes retrieval of a data encryption key. Enabling encryption is a one step process that the system administrators perform to start the encryption process. Table B below shows a flow for enabling encryption.

TABLE B

| Step | Description |
| --- | --- |
| 1 | System Administrator enters a passphrase. |
| 2 | AES 256-bit Master key (MK) is derived from passphrase. |
| 3 | MK is wrapped using TPM. |
| 4 | TPM Wrapped MK is stored in eMMC flash which is protected by an AES key fused in the factory. |

Wrapping the master key using the trusted platform module and storing the TPM wrapped key in the credential vault provides another layer of security in case one of the layers is compromised. For example, any attempt to break into TPM would also require retrieval of the factory fused AES key for decrypting the user data.

The system administrator can choose to enable or disable the filesystem. When the filesystem is enabled, the filesystem requires access to all the plain text encryption keys so that the user data can be decrypted and additional DEKs can be created. Table C below shows a flow of a process for retrieving the clear text MK and decrypting the DEKs

TABLE C

| Step | Description |
| --- | --- |
| 1 | Wrapped MK is read from credential vault. |
| 2 | Wrapped MK is unwrapped using TPM to get the plain text MK. |
| 3 | Plain text MK is used to decrypt the DEKs. |

Figure 4:
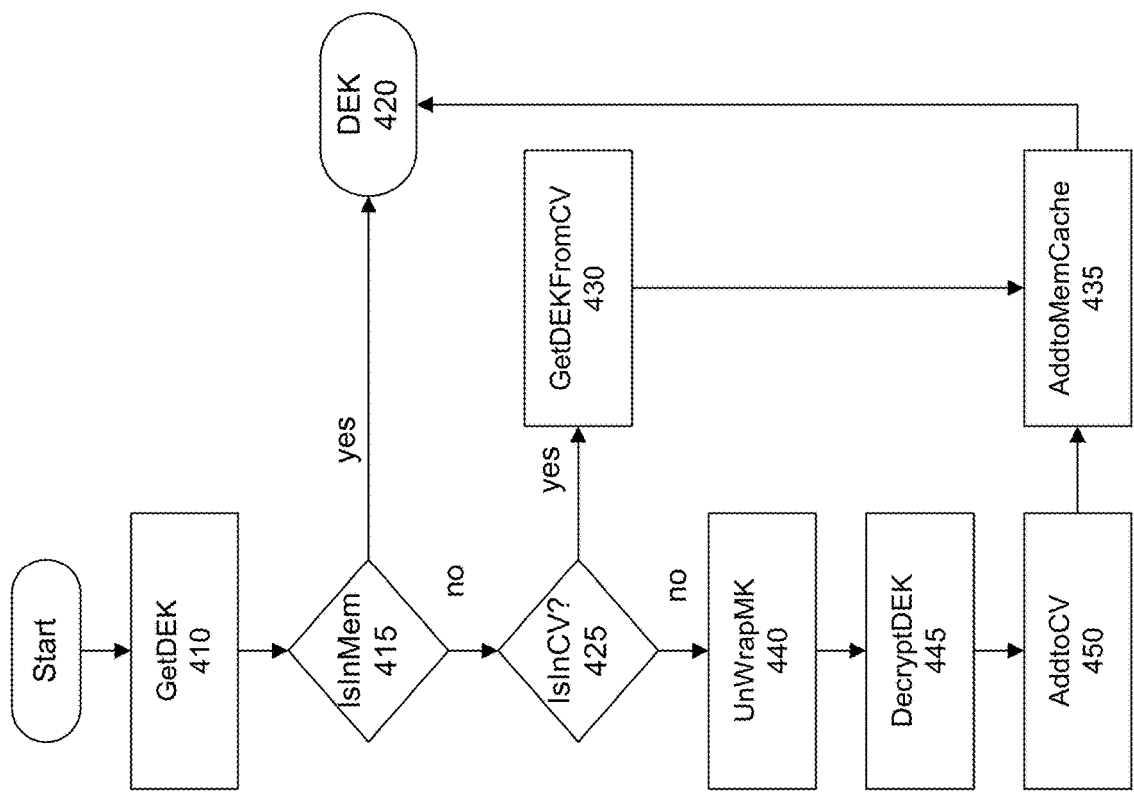
FIG. 4 shows a flow for retrieving a data encryption key in systems having a trusted platform module in accordance with one or more embodiments.

FIG. 4 shows further detail of a flow for storing and retrieving the data encryption key (DEK) when required. In a step 410, a request is received for a DEK. When a DEK is required, an attempt is made to locate the DEK in memory (step 415). If the DEK is found in memory, the plain text DEK is returned (step 420). If the DEK is not in memory, a request is made to check the credential vault for the DEK (step 425).

If the DEK is found in the credential vault, the DEK is retrieved from credential vault using the AES key (step 430). That is, the fused AES key associated with the credential vault is used to decrypt the DEK found in the credential vault to obtain a plain text version or form of the DEK. The plain text form of the DEK is added to the memory cache, e.g., system memory, (step 435) and the plain text DEK is returned (step 420) in response to the request for the DEK.

If the DEK is not found in the credential vault, the wrapped MK key is unwrapped in TPM (step 440) to obtain a plain text form of the MK. In a step 445, the backup storage system is accessed to retrieve the encrypted DEK and the DEK is decrypted using the plain text MK. In a step 450, the plain text DEK is added to the credential vault where it is protected by the AES key of the credential vault. In a step 435, the plain text DEK is also added to the memory cache. In a step 420, the plain text DEK is returned in response to the request to retrieve the DEK.

In other words, if the DEK can be found in the credential vault (or memory cache), it will not be necessary to access or call the TPM. Not having to access the TPM facilitates an improved performance of the system because accessing the TPM is an expensive process.

Table D below illustrates how the data encryption and master keys are stored according to one or more embodiments.

TABLE D

| | Memory | Credential Vault | Disk/Flash Drives |
| --- | --- | --- | --- |
| DEK | Maximum 5% of total keys are stored in plain text. Keys are loaded in memory on demand. In idle condition it will be 0 are stored plain text keys in memory. | 20% of DEKs are encrypted | Always the DEKs are wrapped |
| MK | Wrapped MK is stored. MK is unwrapped only when DEK needs to be unwrapped | Wrapped MK is stored | MK is never stored, providing maximum security |

It should be appreciated that in other embodiments the threshold percentage values of the data encryption keys to be stored in memory and the credential vault can be different from what is shown in table D above. For example, in other embodiments, a maximum of 4% of the total DEKs may be stored in plain text form in memory. A maximum of 22% of the total DEKs may be stored in encrypted form in the credential vault.

As discussed, access to the credential vault is protected. In a specific embodiment, the out-of-band management platform (e.g., iDRAC) is configured to return the MK and DEK only when the request comes over the host to the iDRAC interface (e.g., universal serial bus (USB) network interface controller (NIC)).

In a specific embodiment, the out-of-band management platform (e.g., iDRAC) further checks other conditions to protect the credential vault such as the host's IP address, hostname, serial number, other parameters or combinations of these. Such parameters may be configured in the field by the customer. These affinity parameters of the credential vault can be changed by the customer only when system is unlocked, i.e. when these conditions are satisfied. If tampering is detected due to, for example, a discrepancy or conflict with the host IP address, the system can enter into a lockdown or shutdown mode. The shutdown mode may require reentry of the passphrase, other re-authentication procedures, or both before access is permitted. This helps to prevent access in cases where the system has been removed from the data center without authorization.

Figure 5:
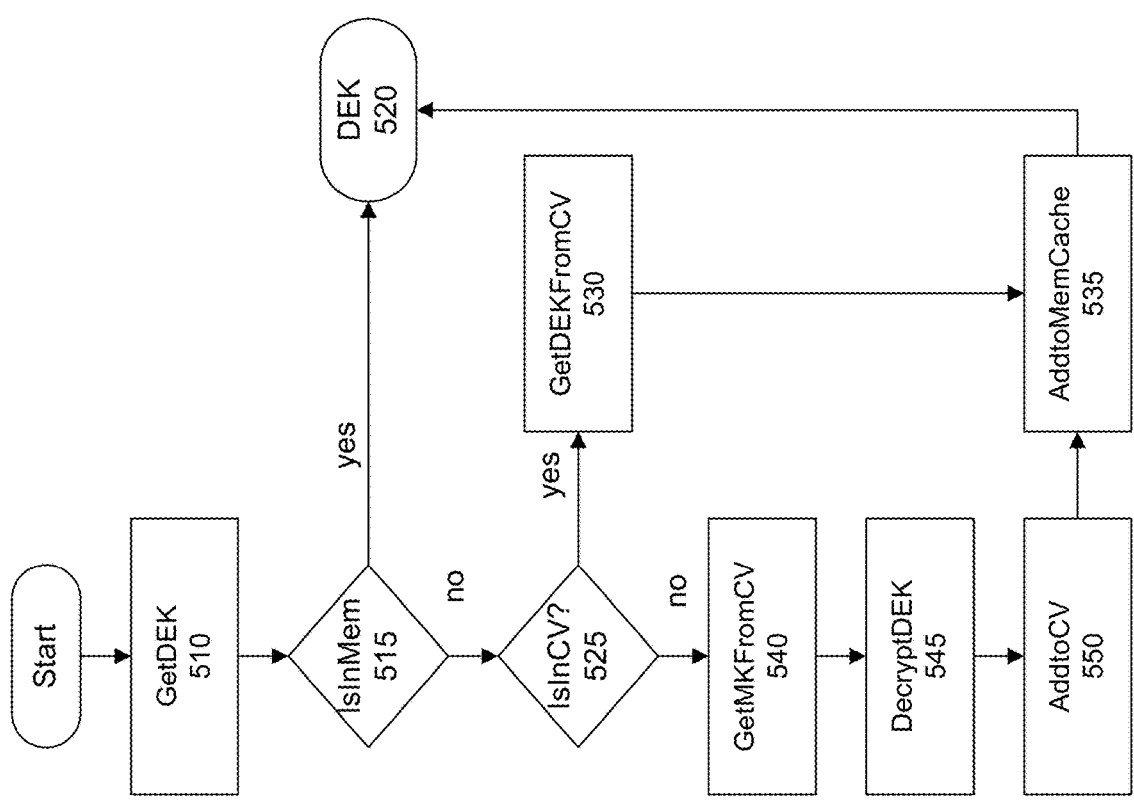
FIG. 5 shows a flow for retrieving a data encryption key in systems not having a trusted platform module in accordance with one or more embodiments.

As discussed, in other embodiments, there can be systems where TPM is not provisioned. In an embodiment, the master and data encryption keys are stored using the AES encryption in the credential vault. Storing the MK and DEK using the AES encryption in the credential vault can provide good security. FIG. 5 shows a flow for storing and retrieving data encryption keys in systems without the TPM. The flow shown in FIG. 5 is similar to the flow shown in FIG. 4. In the flow shown in FIG. 5, however, the MK is protected only by the credential vault. Instead of unwrapping the MK in TPM, the MK is retrieved from credential vault. In addition, if there is sufficient space in credential vault, all the DEKs can be stored in credential vault. This will result in minimizing the amount of time plain text MK is in memory. Plain text MK will be in memory only when the filesystem is started or when new DEKs are created.

More particularly, in a step 510, a request is received for a DEK. In a step 515, an attempt is made to locate the DEK in memory. If the DEK is found in memory, the plain text DEK is returned (step 520). In a step 525, if the DEK cannot be located in memory, a check of the credential vault is made. In a step 530, if the DEK is found in the credential vault the DEK is retrieved from the credential vault using the AES key. In step 535, the decrypted or plain text form of the DEK is added to the memory cache and the plain text DEK is returned (step 520).

In a step 540, if the DEK is not found in the credential vault, the master key is retrieved from the credential vault. As discussed, in systems where the TPM is not provisioned, the master key will not have been wrapped using the TPM. Instead, protection of the master key relies solely on the credential vault. In a step 545, the backup storage is accessed to retrieve the encrypted DEK; and the encrypted DEK is decrypted using the master key. In a step 550, the plain text DEK is added to credential vault (where it is protected by the AES key of the credential vault). In step 535, the plain text DEK is also added to the memory cache. In a step 520, the plain text DEK is returned in response to the request to retrieve the DEK.

Figure 6:
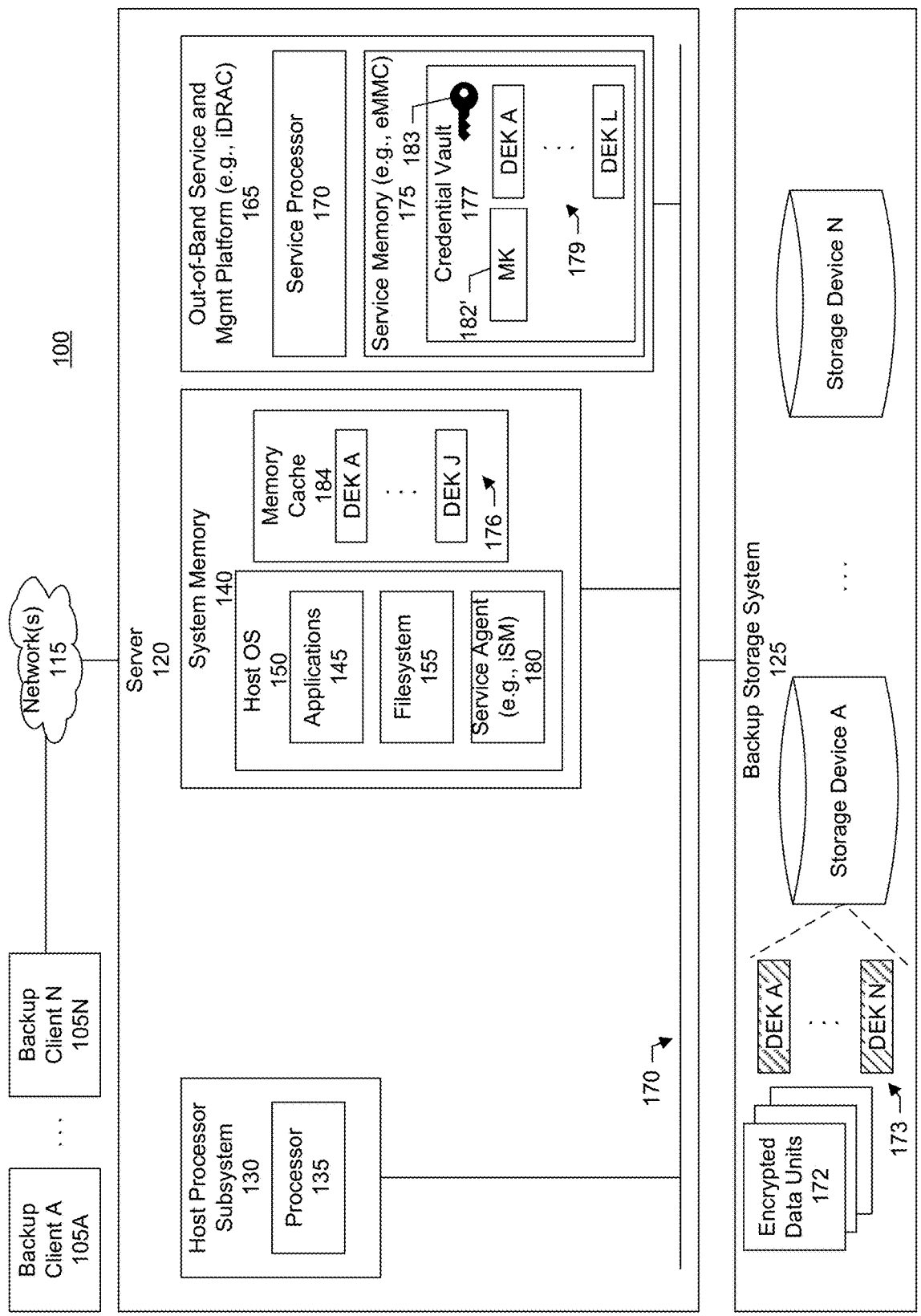
FIG. 6 shows a block diagram of an information handling system for ensuring protection in a system that does not include a trusted platform module in accordance with one or more embodiments.

FIG. 6 shows a block diagram of a system in which the TPM is not provisioned. The block diagram shown in FIG. 6 is similar to the block diagram shown in FIG. 1. In the example of FIG. 6, however, the TPM has been omitted and a master key 182' is shown in the credential vault without a grid pattern to indicate that it is not wrapped by the TPM. The protection of the master key is thus limited to AES key 183 of the credential vault which still provides a good level of security.

In the case of failure of TPM or credential vault, the customer can provide the same passphrase that was provided during the setup. Once the customer has provided the passphrase, the master key can be derived from the passphrase. This step is similar to the one-time setup of enabling the encryption as described in the first stage.

On systems where TPM is not present, the MK may be stored on disks that do not contain the user data to provide a physical separation of user data and MK. The thief needs to steal all the disks to recover plain text data. On systems where TPM is present, TPM can be used to wrap the MK. However, this will lead to either having the plain text DEK in memory for a longer time period than required or incur a performance penalty for unwrapping the MK that is required for decrypting the DEK.

Some benefits of using the credential vault for data at rest protection include:

1) Providing better protection than what is provided by TPM alone. An attacker must get hold of both the TPM seed and the AES key that is fused at the factory that is not readable by firmware/software.

2) Protection against memory attacks since the DEKs and MK are held in memory in plain text only when required; rather than storing all 100% of the plain text DEKs in memory.

3) Use of the credential vault provides faster access to plain text DEK when compared to unwrapping the keys using TPM. It is noted that the key wrapping by the TPM is performed using the Rivest-Shamir-Adleman (RSA) public key cryptography algorithm which is slower while the encryption/decryption in the credential vault is done using a hardware accelerator. An operation can be computed faster in application-specific hardware designed or programmed to compute the operation as compared to specifying the operation using software executing on a general-purpose computer processor.

4) The DEKs in the credential vault self-expire after a period of inactivity or a fixed short time period to minimize the exposure of clear text DEKs without impacting the performance.

5) The out-of-band management platform (e.g., iDRAC) APIs check conditions to protect the credential vault such as host OS's IP address, hostname, serial number, other conditions or combinations of these, which are configured in the field by the customer.

6) The out-of-band management platform (e.g., iDRAC) is configured to return keys only on host to iDRAC interface (USB NIC).

In another specific embodiment, the out-of-band management platform may be associated with a set of policies and a policy enforcement engine. In this specific embodiment, a policy can define the conditions under which keys may be retrieved from the memory cache, credential vault, backup storage system, or combinations of these. For example, a policy may specify that a master key is permitted to be retrieved from the credential vault only during a particular time window. A policy may specify that a data encryption key is permitted to be retrieved from the memory cache, credential vault, or backup storage system only during a particular time window. The policy enforcement engine is responsible for policy enforcement. For example, a request to retrieve a data encryption key that is received outside a specified time window may be denied.

In a specific embodiment, there is a method comprising: storing a subset of a plurality of data encryption keys in a plain text form in a system memory of an information handling system; storing a master key and another subset of the plurality of data encryption keys in a credential vault of the information handling system, separate from the system memory, the credential vault forming a part of an out-of-band management platform that is coupled to a host system processor of a host system of the information handling system, and contents of the credential vault being encrypted by an advanced encryption standard (AES) key; receiving a request for a data encryption key to decrypt a unit of data backed up to backup storage of the information handling system, the unit of data having been encrypted by the data encryption key, and the data encryption key having been encrypted by the master key and stored at the backup storage as an encrypted data encryption key; checking one or more of a plurality of locations for the data encryption key, the plurality of locations comprising the system memory, the credential vault, and the backup storage; and returning a plain text form of the data encryption key in response to the request, wherein when the data encryption key has been found at the backup storage, the data encryption key is decrypted using the master key, and added to the credential vault and the system memory.

In another specific embodiment, the information handling system comprises a trusted platform module (TPM), and the method further comprises: wrapping the master key using the TPM, the master key stored in the credential vault thereby being a TPM wrapped master key; and when the data encryption key is not found in the credential vault, retrieving the TPM wrapped master key from the credential vault; issuing a request to the TPM to unwrap the TPM wrapped master key; and decrypting the encrypted data encryption key at the backup storage using the master key.

In another specific embodiment, the checking for the data encryption key comprises: checking the system memory; after checking the system memory, checking the credential vault; and after the checking the system memory and the credential vault, checking the backup storage.

In another specific embodiment, the checking for the data encryption key comprises: checking the system memory; if the data encryption key is found in the system memory, determining that the data encryption key does not have to be decrypted because a plain text form of the data encryption key has been found; if the data encryption key is not found in the system memory, checking the credential vault; if the data encryption key is found in the credential vault, decrypting the data encryption key using the AES key associated with the credential vault; and if the data encryption key is not found in the credential vault, retrieving the data encryption key from the backup storage, the retrieved data encryption key being encrypted using the master key; retrieving the master key from the credential vault; and decrypting the retrieved data encryption key using the master key to return the plain text form of the data encryption key.

In another specific embodiment, the checking for the data encryption key comprises: checking the system memory; if the data encryption key is found in the system memory, determining that the data encryption key does not have to be decrypted because a plain text form of the data encryption key has been found; if the data encryption key is not found in the system memory, checking the credential vault; if the data encryption key is found in the credential vault, decrypting the data encryption key using the AES key associated with the credential vault; and if the data encryption key is not found in the credential vault, retrieving the master key from the credential vault, the master key having been wrapped by a trusted platform module (TMP); requesting that the TMP unwrap the master key; retrieving the data encryption key from the backup storage, the retrieved data encryption key being encrypted using the master key; and decrypting the retrieved data encryption key using the master key to return the plain text form of the data encryption key.

In another specific embodiment, the method includes configuring a first threshold percent value defining a maximum percentage of the plurality of data encryption keys allowed to be stored in plain text form in the system memory; and configuring a second threshold percent value defining a maximum percentage of the plurality of data encryption keys allowed to be stored in the credential vault.

In another specific embodiment, there is a system comprising: a processor; and memory configured to store one or more sequences of instructions which, when executed by the processor, cause the processor to carry out the steps of: storing a subset of a plurality of data encryption keys in a plain text form in a system memory of an information handling system; storing a master key and another subset of the plurality of data encryption keys in a credential vault of the information handling system, separate from the system memory, the credential vault forming a part of an out-of-band management platform that is coupled to a host system processor of a host system of the information handling system, and contents of the credential vault being encrypted by an advanced encryption standard (AES) key; receiving a request for a data encryption key to decrypt a unit of data backed up to backup storage of the information handling system, the unit of data having been encrypted by the data encryption key, and the data encryption key having been encrypted by the master key and stored at the backup storage as an encrypted data encryption key; checking one or more of a plurality of locations for the data encryption key, the plurality of locations comprising the system memory, the credential vault, and the backup storage; and returning a plain text form of the data encryption key in response to the request, wherein when the data encryption key has been found at the backup storage, the data encryption key is decrypted using the master key, and added to the credential vault and the system memory.

In another specific embodiment, there is a computer program product, comprising a non-transitory computer-readable medium having a computer-readable program code embodied therein, the computer-readable program code adapted to be executed by one or more processors to implement a method comprising: storing a subset of a plurality of data encryption keys in a plain text form in a system memory of an information handling system; storing a master key and another subset of the plurality of data encryption keys in a credential vault of the information handling system, separate from the system memory, the credential vault forming a part of an out-of-band management platform that is coupled to a host system processor of a host system of the information handling system, and contents of the credential vault being encrypted by an advanced encryption standard (AES) key; receiving a request for a data encryption key to decrypt a unit of data backed up to backup storage of the information handling system, the unit of data having been encrypted by the data encryption key, and the data encryption key having been encrypted by the master key and stored at the backup storage as an encrypted data encryption key; checking one or more of a plurality of locations for the data encryption key, the plurality of locations comprising the system memory, the credential vault, and the backup storage; and returning a plain text form of the data encryption key in response to the request, wherein when the data encryption key has been found at the backup storage, the data encryption key is decrypted using the master key, and added to the credential vault and the system memory.

Figure 7:
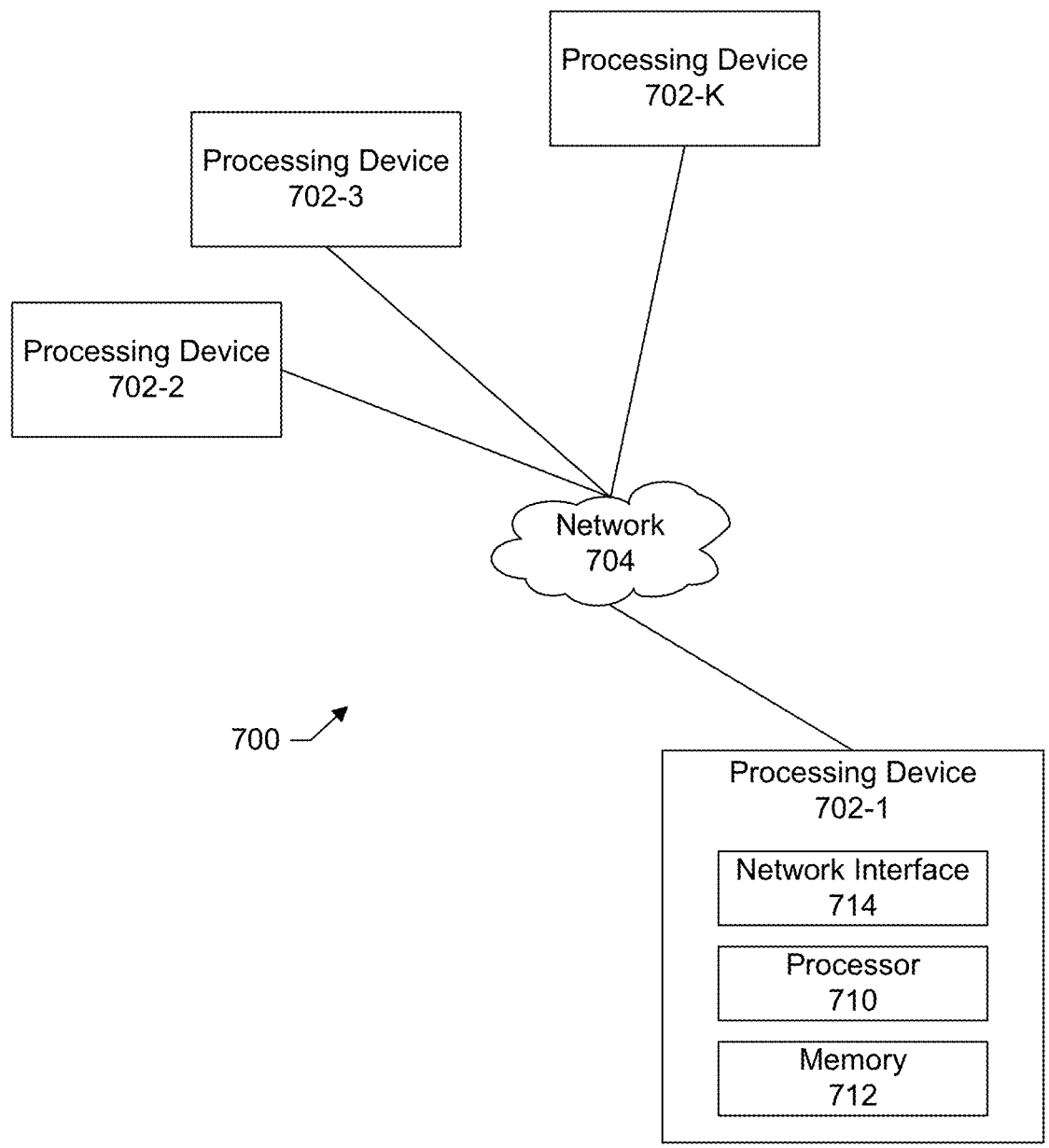
FIG. 7 shows a block diagram of a processing platform that may be utilized to implement at least a portion of an information processing system, according to one or more embodiments.

FIG. 7 shows an example of a processing platform 700. The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 110 are illustratively implemented in the form of software running on one or more processing devices.

FIG. 8 shows a system block diagram of a computer system 805 used to execute the software of the present system described herein. The computer system includes a monitor 807, keyboard 815, and mass storage devices 820. Computer system 805 further includes subsystems such as central processor 825, system memory 830, input/output (I/O) controller 835, display adapter 840, serial or universal serial bus (USB) port 845, network interface 850, and speaker 855. The system may also be used with computer systems with additional or fewer subsystems. For example, a computer system could include more than one processor 825 (i.e., a multiprocessor system) or a system may include a cache memory.

Arrows such as 860 represent the system bus architecture of computer system 805. However, these arrows are illustrative of any interconnection scheme serving to link the subsystems. For example, speaker 855 could be connected to the other subsystems through a port or have an internal direct connection to central processor 825. The processor may include multiple processors or a multicore processor, which may permit parallel processing of information. Computer system 805 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
storing a subset of a plurality of data encryption keys in a plain text form in a system memory of an information handling system;
storing a master key and another subset of the plurality of data encryption keys in a credential vault of the information handling system, separate from the system memory, the credential vault forming a part of an out-of-band management platform that is coupled to a host system processor of a host system of the information handling system, and contents of the credential vault being encrypted by an advanced encryption standard (AES) key;
receiving a request for a data encryption key to decrypt a unit of data backed up to backup storage of the information handling system, the unit of data having been encrypted by the data encryption key, and the data encryption key having been encrypted by the master key and stored at the backup storage as an encrypted data encryption key;
checking one or more of a plurality of locations for the data encryption key, the plurality of locations comprising the system memory, the credential vault, and the backup storage; and
returning a plain text form of the data encryption key in response to the request, wherein when the data encryption key has been found at the backup storage, the data encryption key is decrypted using the master key, and added to the credential vault and the system memory, wherein the checking for the data encryption key comprises:
checking the system memory;
if the data encryption key is found in the system memory, determining that the data encryption key does not have to be decrypted because a plain text form of the data encryption key has been found;
if the data encryption key is not found in the system memory, checking the credential vault;
if the data encryption key is found in the credential vault, decrypting the data encryption key using the AES key associated with the credential vault; and
if the data encryption key is not found in the credential vault,
retrieving the master key from the credential vault, the master key having been wrapped by a trusted platform module (TMP);
requesting that the TMP unwrap the master key;
retrieving the data encryption key from the backup storage, the retrieved data encryption key being encrypted using the master key; and
decrypting the retrieved data encryption key using the master key to return the plain text form of the data encryption key.

2. The method of claim 1 wherein the checking for the data encryption key comprises:
checking the system memory;
after checking the system memory, checking the credential vault; and
after the checking the system memory and the credential vault, checking the backup storage.

3. The method of claim 1 further comprising:
configuring a first threshold percent value defining a maximum percentage of the plurality of data encryption keys allowed to be stored in plain text form in the system memory; and
configuring a second threshold percent value defining a maximum percentage of the plurality of data encryption keys allowed to be stored in the credential vault.

4. A system comprising: a processor; and memory configured to store one or more sequences of instructions which, when executed by the processor, cause the processor to carry out the steps of:
storing a subset of a plurality of data encryption keys in a plain text form in a system memory of an information handling system;
storing a master key and another subset of the plurality of data encryption keys in a credential vault of the information handling system, separate from the system memory, the credential vault forming a part of an out-of-band management platform that is coupled to a host system processor of a host system of the information handling system, and contents of the credential vault being encrypted by an advanced encryption standard (AES) key;
receiving a request for a data encryption key to decrypt a unit of data backed up to backup storage of the information handling system, the unit of data having been encrypted by the data encryption key, and the data encryption key having been encrypted by the master key and stored at the backup storage as an encrypted data encryption key;
checking one or more of a plurality of locations for the data encryption key, the plurality of locations comprising the system memory, the credential vault, and the backup storage; and
returning a plain text form of the data encryption key in response to the request, wherein when the data encryption key has been found at the backup storage, the data encryption key is decrypted using the master key, and added to the credential vault and the system memory, wherein the checking for the data encryption key comprises:
checking the system memory;
if the data encryption key is found in the system memory, determining that the data encryption key does not have to be decrypted because a plain text form of the data encryption key has been found;
if the data encryption key is not found in the system memory, checking the credential vault;
if the data encryption key is found in the credential vault, decrypting the data encryption key using the AES key associated with the credential vault; and
if the data encryption key is not found in the credential vault,
retrieving the master key from the credential vault, the master key having been wrapped by a trusted platform module (TMP);
requesting that the TMP unwrap the master key;
retrieving the data encryption key from the backup storage, the retrieved data encryption key being encrypted using the master key; and
decrypting the retrieved data encryption key using the master key to return the plain text form of the data encryption key.

5. The system of claim 4 wherein the checking for the data encryption key comprises:
checking the system memory;
after checking the system memory, checking the credential vault; and
after the checking the system memory and the credential vault, checking the backup storage.

6. The system of claim 4 wherein the processor further carries out the steps of:
- configuring a first threshold percent value defining a maximum percentage of the plurality of data encryption keys allowed to be stored in plain text form in the system memory; and
- configuring a second threshold percent value defining a maximum percentage of the plurality of data encryption keys allowed to be stored in the credential vault.

7. A computer program product, comprising a non-transitory computer-readable medium having a computer-readable program code embodied therein, the computer-readable program code adapted to be executed by one or more processors to implement a method comprising:
- storing a subset of a plurality of data encryption keys in a plain text form in a system memory of an information handling system;
- storing a master key and another subset of the plurality of data encryption keys in a credential vault of the information handling system, separate from the system memory, the credential vault forming a part of an out-of-band management platform that is coupled to a host system processor of a host system of the information handling system, and contents of the credential vault being encrypted by an advanced encryption standard (AES) key;
- receiving a request for a data encryption key to decrypt a unit of data backed up to backup storage of the information handling system, the unit of data having been encrypted by the data encryption key, and the data encryption key having been encrypted by the master key and stored at the backup storage as an encrypted data encryption key;
- checking one or more of a plurality of locations for the data encryption key, the plurality of locations comprising the system memory, the credential vault, and the backup storage; and
- returning a plain text form of the data encryption key in response to the request, wherein when the data encryption key has been found at the backup storage, the data encryption key is decrypted using the master key, and added to the credential vault and the system memory, wherein the checking for the data encryption key comprises:
- checking the system memory;
- if the data encryption key is found in the system memory, determining that the data encryption key does not have to be decrypted because a plain text form of the data encryption key has been found;
- if the data encryption key is not found in the system memory, checking the credential vault;
- if the data encryption key is found in the credential vault, decrypting the data encryption key using the AES key associated with the credential vault; and
- if the data encryption key is not found in the credential vault,
  - retrieving the master key from the credential vault, the master key having been wrapped by a trusted platform module (TMP);
- requesting that the TMP unwrap the master key;
  - retrieving the data encryption key from the backup storage, the retrieved data encryption key being encrypted using the master key; and
  - decrypting the retrieved data encryption key using the master key to return the plain text form of the data encryption key.

8. The computer program product of claim 7 wherein the checking for the data encryption key comprises:
- checking the system memory;
- after checking the system memory, checking the credential vault; and
- after the checking the system memory and the credential vault, checking the backup storage.

9. The computer program product of claim 7 wherein the method further comprises:
- configuring a first threshold percent value defining a maximum percentage of the plurality of data encryption keys allowed to be stored in plain text form in the system memory; and
- configuring a second threshold percent value defining a maximum percentage of the plurality of data encryption keys allowed to be stored in the credential vault.

\* \* \* \* \*